United States Patent
Buford (10) Patent No.: US 12,122,301 B2
(45) Date of Patent: Oct. 22, 2024

(54) WINCH MOUNTING DEVICE

(71) Applicant: Jasper Buford, Pearl, MS (US)

(72) Inventor: Jasper Buford, Pearl, MS (US)

(*) Notice: Subject to any disclaimer, the term of this patent is extended or adjusted under 35 U.S.C. 154(b) by 227 days.

(21) Appl. No.: 17/846,142

(22) Filed: Jun. 22, 2022

(65) Prior Publication Data
US 2023/0415662 A1 Dec. 28, 2023

(51) Int. Cl.
*B60R 11/00* (2006.01)
*B60P 1/00* (2006.01)
*B62D 65/02* (2006.01)

(52) U.S. Cl.
CPC ........... *B60R 11/00* (2013.01); *B60P 1/00* (2013.01); *B62D 65/02* (2013.01); *B60R 2011/004* (2013.01); *B60R 2011/0052* (2013.01); *B60R 2011/0066* (2013.01)

(58) Field of Classification Search
CPC .......... B60R 11/00; B60R 2011/004; B60R 2011/0066; B60P 1/00; B62D 65/02
See application file for complete search history.

(56) References Cited

U.S. PATENT DOCUMENTS

| 7,344,120 B2* | 3/2008 | McFarland | B66D 1/00 |
| | | | 254/323 |
| 10,308,488 B2 | 6/2019 | Hall | |
| 10,603,966 B2 | 3/2020 | Stojkovic | |
| 2014/0021328 A1 | 1/2014 | Higgs | |
| 2019/0283649 A1* | 9/2019 | Delaurier | B60P 3/07 |
| 2022/0194288 A1* | 6/2022 | Allicock | B60P 1/435 |

FOREIGN PATENT DOCUMENTS

| CA | 2764078 | | 3/2013 | |
| CA | 2764078 A1 * | | 3/2013 | ............... B60R 9/06 |

* cited by examiner

*Primary Examiner* — Lynn E Schwenning
*Assistant Examiner* — Lucia Elba Rodriguez (57) ABSTRACT

A winch mounting device for mounting a winch to an All-Terrain Vehicle (ATV) includes a bracket, which is mountable to a frame of the ATV so that the bracket is positioned at a front end of a bed and behind a seat of the ATV. A winch is mountable to the bracket, positioning a user to attach a cable of the winch to a load and to winch the load into the bed.

9 Claims, 6 Drawing Sheets

WINCH MOUNTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

Field of the Invention

The disclosure relates to mounting devices and more particularly pertains to a new mounting device for mounting a winch to an All-Terrain Vehicle (ATV). The present invention discloses a mounting device that is easily mounted to a frame of the ATV, allowing a user to winch loads onto a bed of the ATV.

Description of Related Art Including Information Disclosed Under 37 CFR 1.97 and 1.98

The prior art relates to mounting devices, which may comprise rotatable mounts and frames for mounting winches to a front wall truck beds, between sidewalls of truck beds, and to front ends and rear ends of vehicles. What is lacking in the prior art is a mounting device comprising a bracket, which is mountable to a frame of an All-Terrain Vehicle (ATV) so that the bracket is positioned at a front end of a bed and behind a seat of the ATV. A winch is mountable to the bracket, positioning a user to attach a cable of the winch to a load and to winch the load into the bed

BRIEF SUMMARY OF THE INVENTION

An embodiment of the disclosure meets the needs presented above by generally comprising a bracket, which is configured to be mountable to a frame of an All-Terrain Vehicle (ATV) so that the bracket is positioned at a front end of a bed and behind a seat of the ATV. The bracket also is configured for mounting of a winch, positioning a user to attach a cable of the winch to a load and to winch the load into the bed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new mounting device embodying the principles and concepts of an embodiment of the disclosure and generally designated by the reference numeral 10 will be described.

As best illustrated in FIGS. 1 through 7, the winch mounting device 10 generally comprises a bracket 12, which is configured to be mountable to a frame 14 of an All-Terrain Vehicle (ATV) 16 so that the bracket 12 is positioned at a front end 18 of a bed 20 and behind a seat 22 of the ATV 16. The bracket 12 also is configured for mounting of a winch 24, positioning a user to attach a cable 26 of the winch 24 to a load and to winch the load into the bed 20.

Figure 4:
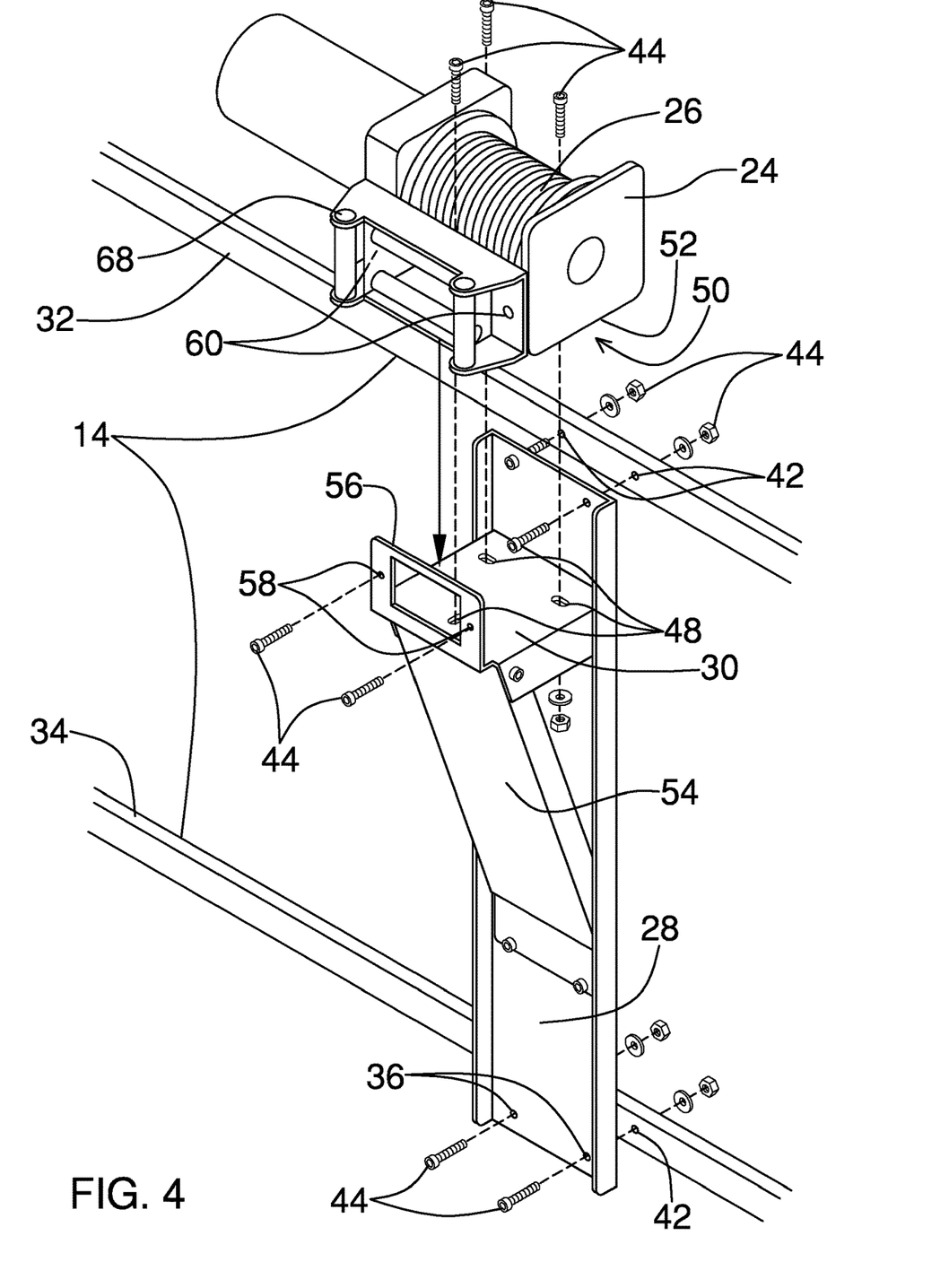
FIG. 4 is an in-use view of an embodiment of the disclosure.
Figure 5:
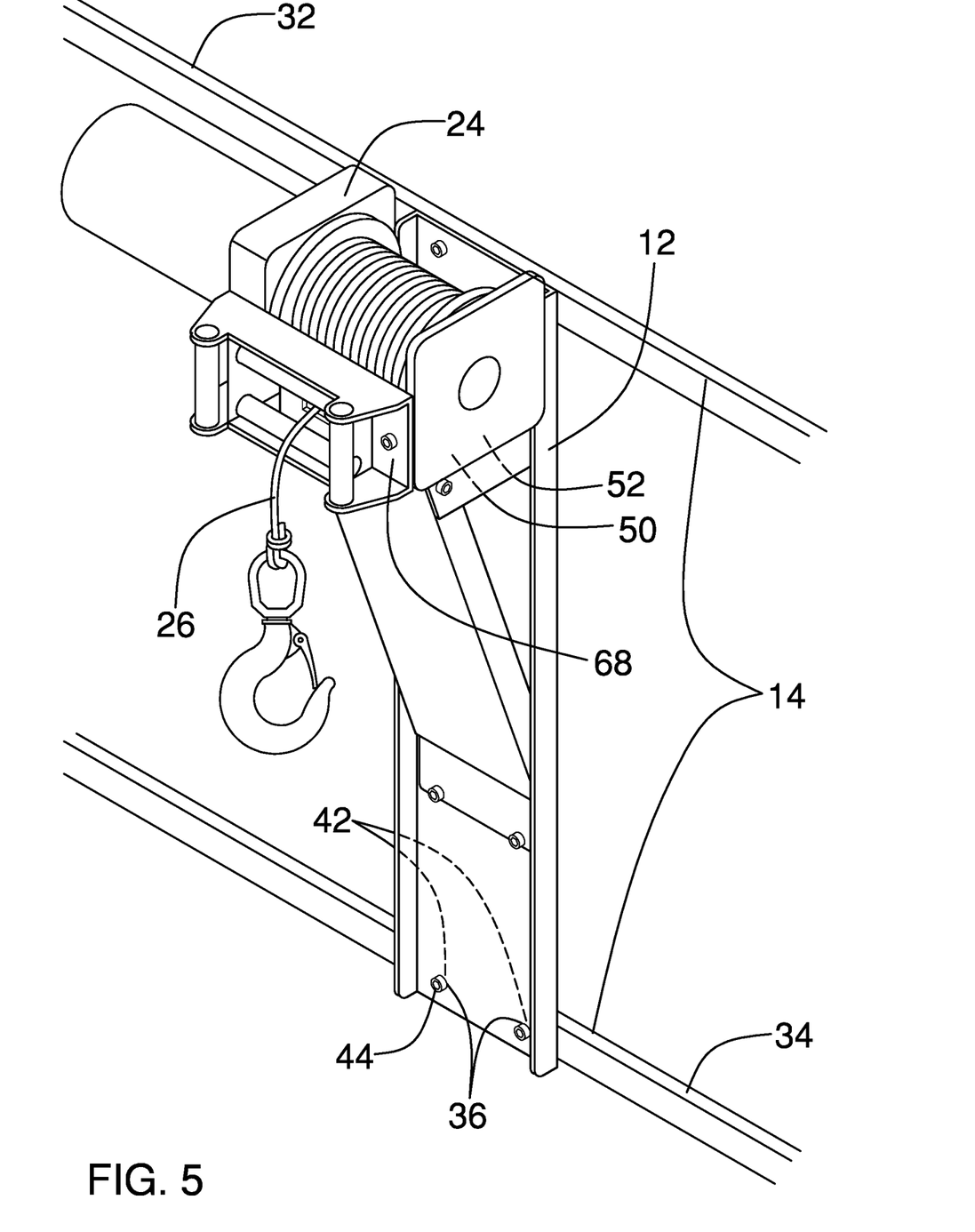
FIG. 5 is an in-use view of an embodiment of the disclosure.
Figure 6:
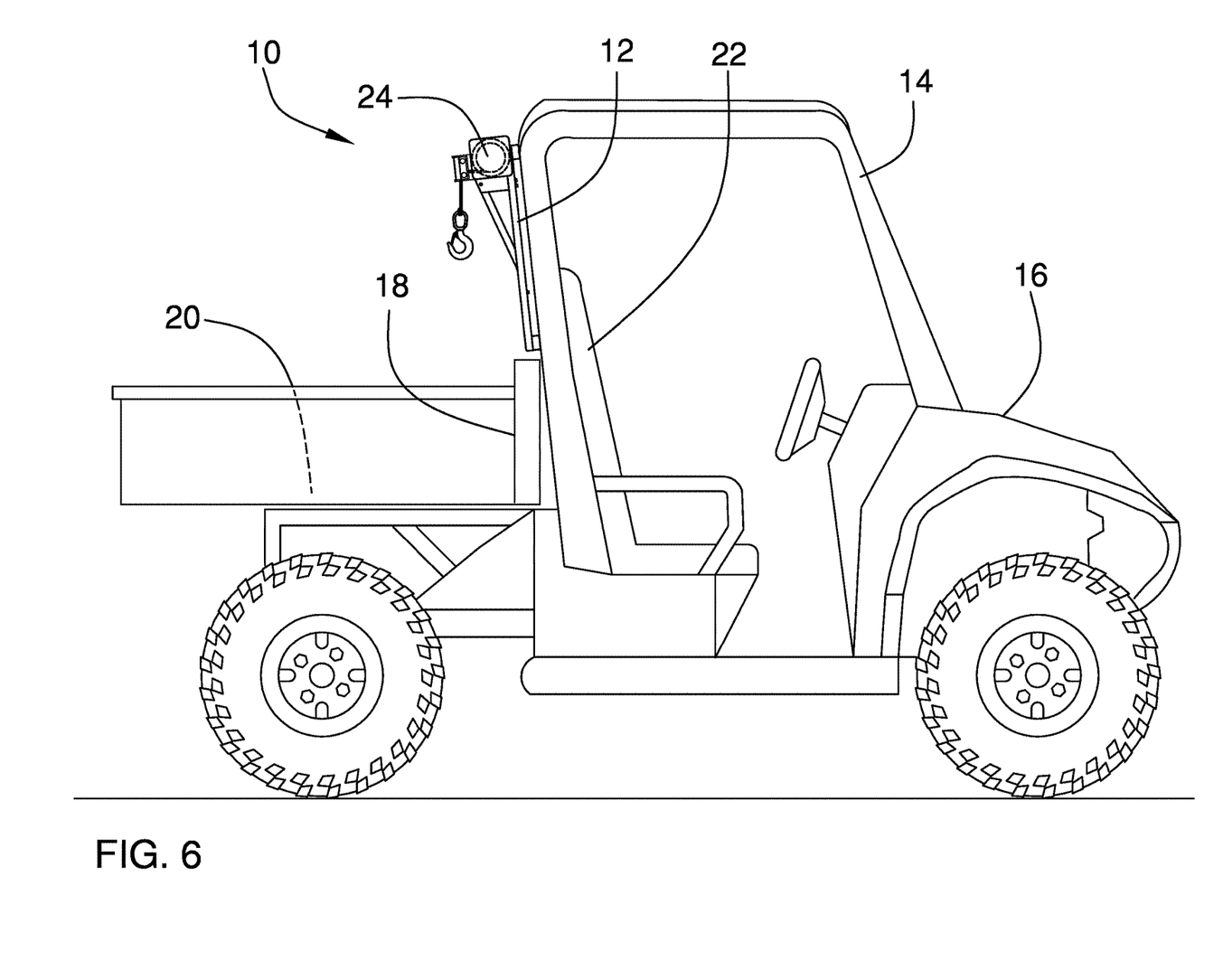
FIG. 6 is an in-use view of an embodiment of the disclosure.

The bracket 12 comprises a first plate 28 and a second plate 30, although the present invention anticipates brackets of a variety of configurations. The first plate 28 is sized to extend between an upper crossmember 32 and a lower crossmember 34 of the frame 14 of the ATV 16. Each first hole 36 of a plurality of first holes 36 is positioned in the first plate 28 proximate to an upper end 38 or a lower end 40 of the first plate 28. Each first hole 36 and an associated crossmember hole 42 of a plurality of crossmember holes 42, which is positioned in the upper crossmember 32 and the lower crossmember 34, are configured for insertion of a respective article of mounting hardware 44 of a plurality of articles of mounting hardware 44 to attach the first plate 28 to the upper crossmember 32 and the lower crossmember 34. The mounting hardware 44 may comprise bolts, nuts, and washers, as shown in FIG. 4. The present invention also anticipates the first plate 28 being welded to one or both of the upper crossmember 32 and the lower crossmember 34.

The second plate 30 is attached to and extends substantially perpendicularly from the first plate 28, proximate to the upper end 38 of the first plate 28. A plurality of second holes 48 is positioned in the second plate 30. Each second hole 48 is alignable with a respective plate hole 50 of a plurality of plate holes 50, which is positioned in a mounting plate 52 of the winch 24. The second hole 48 and the respective plate hole 50 are configured for insertion of a respective article of mounting hardware 44 to attach the winch 24 to the second plate 30. The present invention also anticipates the winch 24 being welded to the second plate 30.

Figure 1:
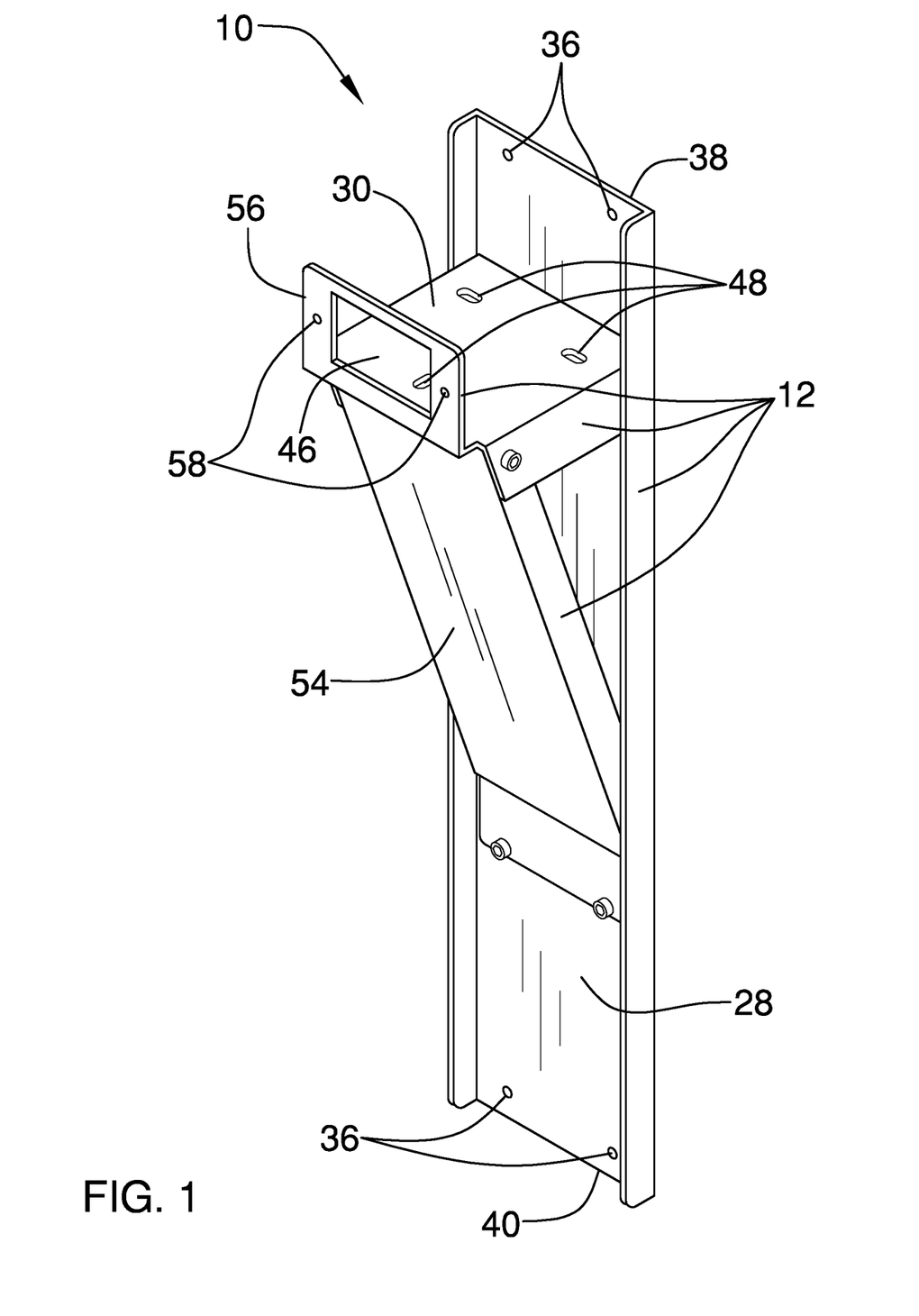
FIG. 1 is an isometric perspective view of a winch mounting device according to an embodiment of the disclosure.
Figure 2:
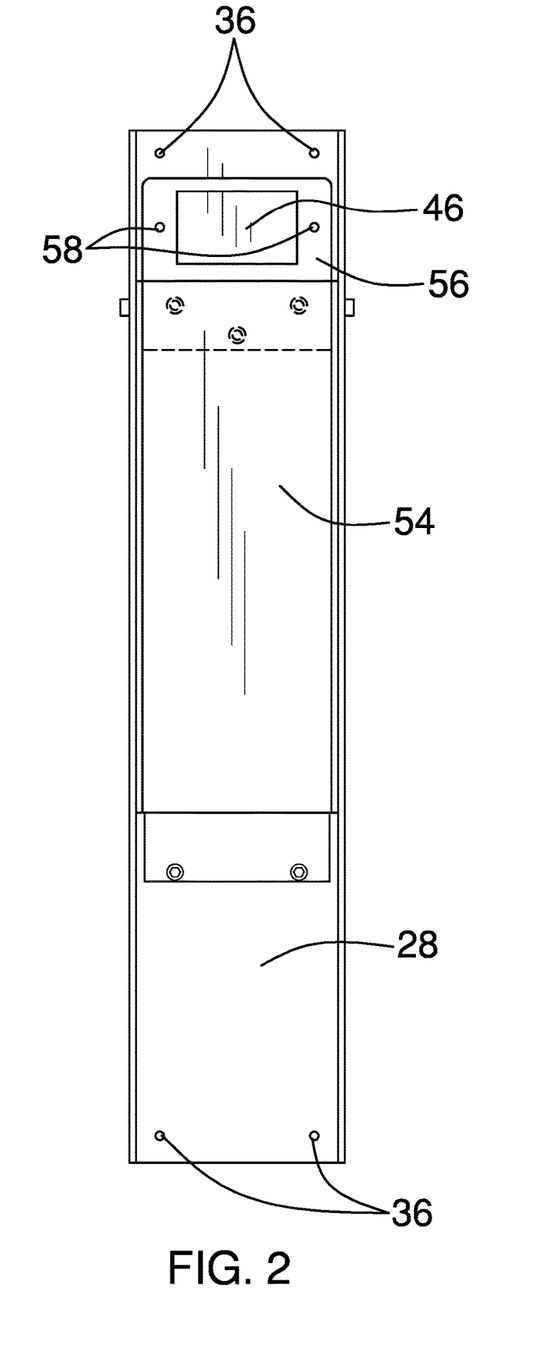
FIG. 2 is a front view of an embodiment of the disclosure.
Figure 3:
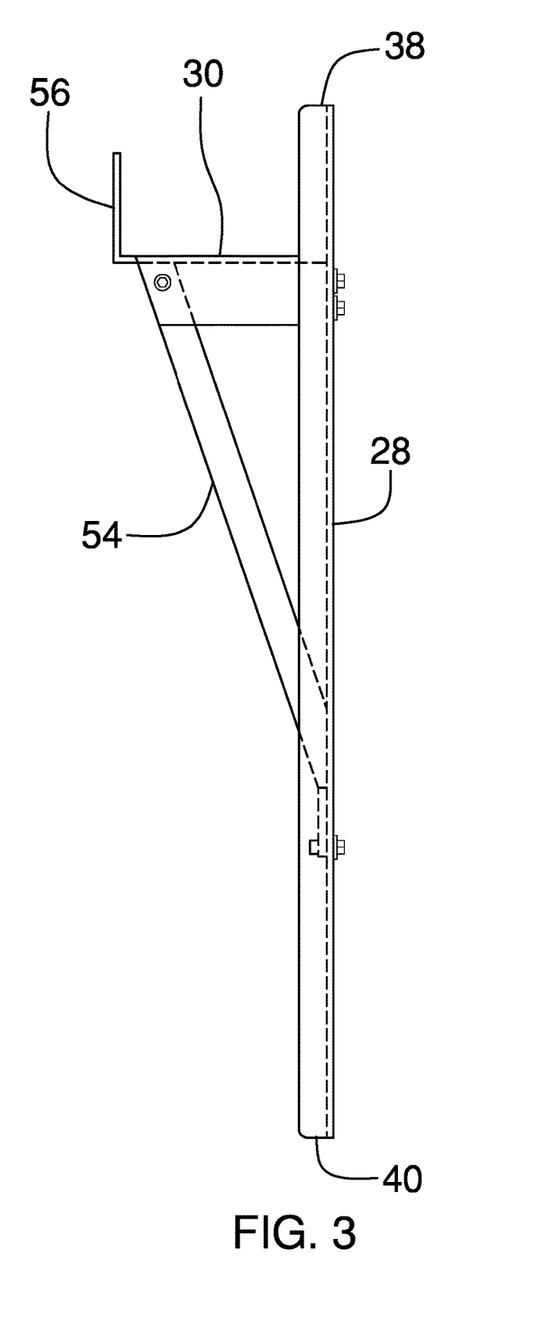
FIG. 3 is a side view of an embodiment of the disclosure.

The bracket 12 also may comprise a strut 54, which is attached to and which extends between the first plate 28 and the second plate 30. As shown in FIG. 3, the strut 54 is attached to the second plate 30 distal from the first plate 28 and extends angularly to the first plate 28. The strut 54 is attached to the first plate 28 between the second plate 30 and the lower end 40 of the first plate 28. The strut 54 is configured to distribute a mass of a load on the winch 24 between the upper crossmember 32 and the lower crossmember 34 of the frame 14. The strut 54, the first plate 28, and the second plate 30 may comprise C-channel, as shown in FIG. 1, square tubing, or the like, so that the strut 54, the first plate 28, and the second plate 30 are configured to resist bending.

The bracket 12 also may comprise a third plate 56, which is attached to and which extends substantially perpendicularly from the second plate 30 distal from the first plate 28. As shown in FIG. 3, the third plate 56 is opposingly positioned relative to the strut 54. An opening 46 is positioned in the third plate 56 and is configured for insertion of the cable 26 that extends from the winch 24.

A pair of third holes 58 is positioned in the third plate 56, with the third holes 58 bracketing the opening 46. Each third hole 58 is alignable with a respective mounting hole 60 of a pair of mounting holes 60, which is positioned in a mounting bracket 68 of the winch 24. The third hole 58 and the respective mounting hole 60 are configured for insertion of a respective article of mounting hardware 44 to attach the winch 24 to the third plate 56.

Figure 7:
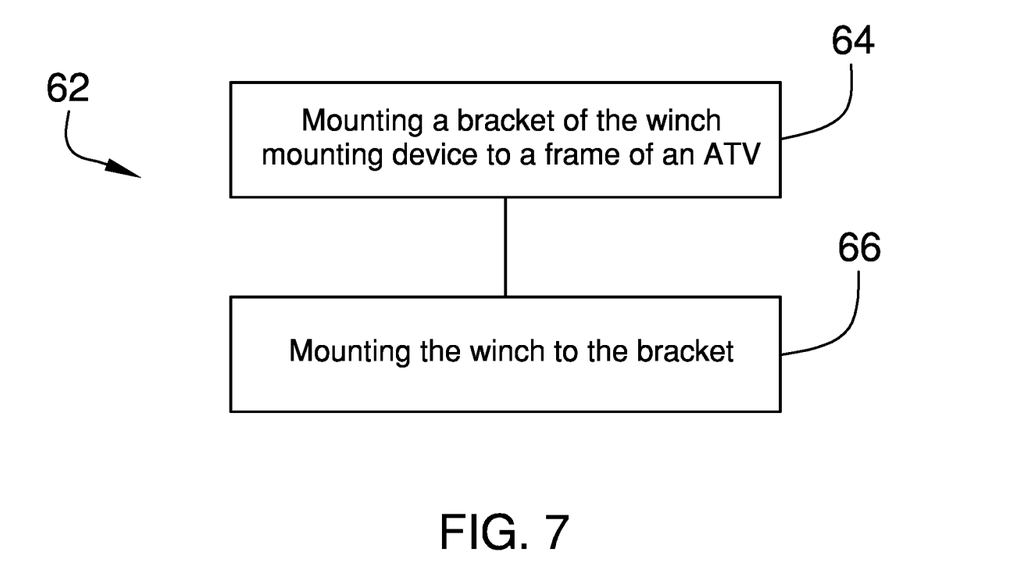
FIG. 7 is a flow diagram for a method utilizing an embodiment of the disclosure.

The winch mounting device 10 enables a method of mounting a winch to an ATV 62. The method 62 comprises a first step 64 of mounting a bracket 12 of the winch mounting device 10 to the frame 14 of the ATV 16 so that the bracket 12 is positioned at the front end 18 of the bed 20 behind the seat 22 of the ATV 16. The first step 64 of mounting the bracket 12 to the frame 14 of the ATV 16 may entail insertion of a respective article of mounting hardware 44 through each first hole 36 and its associated crossmember hole 42.

A second step 66 of the method 62 is mounting the winch 24 to the bracket 12, positioning a user for attaching the cable 26 of the winch 24 to a load and for winching the load into the bed 20. The second step 66 of mounting the winch 24 to the bracket 12 may entail insertion of a respective article of mounting hardware 44 through each second hole 48 and its associated plate hole 50. The second step 66 of mounting the winch 24 to the bracket 12 also may entail insertion of a respective article of mounting hardware 44 through each third hole 58 and its associated mounting hole 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A winch mounting device comprising:
a bracket configured to be mountable to a frame of an All-Terrain Vehicle (ATV), such that the bracket is positioned at a front end of a bed of the ATV behind a seat of the ATV, the bracket being configured for mounting of a winch, positioning a user for attaching a cable of the winch to a load and for winching the load into the bed; and
wherein the bracket comprises
a first plate sized such that the first plate is configured for extending between an upper crossmember and a lower crossmember of the frame of the ATV;
a plurality of first holes, each first hole being positioned in the first plate proximate to an upper end or a lower end of the first plate, wherein each first hole and an associated crossmember hole of a plurality of crossmember holes positioned in the upper crossmember and the lower crossmember are configured for insertion of a respective article of mounting hardware of a plurality of articles of mounting hardware for attaching the first plate to the upper crossmember and the lower crossmember;
a second plate attached to and extending substantially perpendicularly from the first plate proximate to the upper end of the first plate;
a plurality of second holes positioned in the second plate, each second hole being alignable with a respective plate hole of a plurality of plate holes positioned in a mounting plate of the winch, wherein the second hole and the respective plate hole are configured for insertion of a respective article of mounting hardware for attaching the winch to the second plate;
a strut attached to and extending between the first plate and the second plate, the strut being attached to the second plate distal from the first plate, the strut extending angularly to the first plate and being attached to the first plate between the second plate and the lower end of the first plate, wherein the strut is configured for distributing a mass of a load on the winch between the upper crossmember and the lower crossmember of the frame; and
wherein the strut, the first plate, and the second plate comprise C-channel, wherein the strut, the first plate, and the second plate are configured for resisting bending.

2. The winch mounting device of claim 1, further including:

a third plate attached to and extending substantially perpendicularly from the second plate distal from the first plate, the third plate being opposingly positioned relative to the strut; and an opening positioned in the third plate, wherein the opening is configured for insertion of the cable extending from the winch.

3. The winch mounting device of claim 2, further including a pair of third holes positioned in the third plate and bracketing the opening, each third hole being alignable with a respective mounting hole of a pair of mounting holes positioned in a mounting bracket of the winch, wherein the third hole and the respective mounting hole are configured for insertion of a respective article of mounting hardware for attaching the winch to the third plate.

4. A winch mounting device comprising:
a bracket configured to be mountable to a frame of an All-Terrain Vehicle (ATV), such that the bracket is positioned at a front end of a bed of the ATV behind a seat of the ATV, the bracket being configured for mounting of a winch, positioning a user for attaching a cable of the winch to a load and for winching the load into the bed; and
the bracket further comprising:
a first plate sized such that the first plate is configured for extending between an upper crossmember and a lower crossmember of the frame of the ATV;
a plurality of first holes, each first hole being positioned in the first plate proximate to an upper end or a lower end of the first plate, wherein each first hole and an associated crossmember hole of a plurality of crossmember holes positioned in the upper crossmember and the lower crossmember are configured for insertion of a respective article of mounting hardware of a plurality of articles of mounting hardware for attaching the first plate to the upper crossmember and the lower crossmember;
a second plate attached to and extending substantially perpendicularly from the first plate proximate to the upper end of the first plate;
a plurality of second holes positioned in the second plate, each second hole being alignable with a respective plate hole of a plurality of plate holes positioned in a mounting plate of the winch, wherein the second hole and the respective plate hole are configured for insertion of a respective article of mounting hardware for attaching the winch to the second plate;
a strut attached to and extending between the first plate and the second plate, the strut being attached to the second plate distal from the first plate, the strut extending angularly to the first plate and being attached to the first plate between the second plate and the lower end of the first plate, wherein the strut is configured for distributing a mass of a load on the winch between the upper crossmember and the lower crossmember of the frame, the strut, the first plate, and the second plate comprising C-channel, wherein the strut, the first plate, and the second plate are configured for resisting bending;
a third plate attached to and extending substantially perpendicularly from the second plate distal from the first plate, the third plate being opposingly positioned relative to the strut;
an opening positioned in the third plate, wherein the opening is configured for insertion of the cable extending from the winch; and a pair of third holes positioned in the third plate and bracketing the opening, each third hole being alignable with a respective mounting hole of a pair of mounting holes positioned in a mounting bracket of the winch, wherein the third hole and the respective mounting hole are configured for insertion of a respective article of mounting hardware for attaching the winch to the third plate.

5. A winch mounting system comprising:
an All-Terrain Vehicle (ATV);
a bracket mounted to a frame of the ATV, such that the bracket is positioned at a front end of a bed of the ATV behind a seat of the ATV;
a winch mounted to the bracket, wherein a cable of the winch is configured for attaching to a load, positioning a user for winching the load into the bed; and
wherein the bracket comprises
a first plate extending between and attached to an upper crossmember and a lower crossmember of the frame of the ATV; and
a second plate attached to and extending substantially perpendicularly from the first plate proximate to an upper end of the first plate, the winch being mounted to the second plate;
a strut attached to and extending between the first plate and the second plate, the strut being attached to the second plate distal from the first plate, the strut extending angularly to the first plate and being attached to the first plate between the second plate and a lower end of the first plate, wherein the strut is configured for distributing a mass of a load on the winch between the upper crossmember and the lower crossmember of the frame; and
wherein the strut, the first plate, and the second plate comprise C-channel wherein the strut, the first plate, and the second plate are configured for resisting bending.

6. The winch mounting system of claim 5, further including:
a third plate attached to and extending substantially perpendicularly from the second plate distal from the first plate, the third plate being opposingly positioned relative to the strut; and
an opening positioned in the third plate, the cable extending from the winch through the opening.

7. The winch mounting system of claim 6, further including the winch being attached to the third plate.

8. A method of mounting a winch to an All-Terrain Vehicle using a winch mounting device, the method comprising the steps of:
mounting a bracket of the winch mounting device to a frame of the All-Terrain Vehicle (ATV), such that the bracket is positioned at a front end of a bed of the ATV behind a seat of the ATV;
mounting the winch to the bracket, positioning a user for attaching a cable of the winch to a load and for winching the load into the bed;
wherein the bracket comprises
a first plate sized such that the first plate is configured for extending between an upper crossmember and a lower crossmember of the frame of the ATV, and
a second plate attached to and extending substantially perpendicularly from the first plate proximate to an upper end of the first plate;

wherein a plurality of first holes is positioned in the first plate, each first hole being positioned in the first plate proximate to the upper end or a lower end of the first plate;

wherein a plurality of crossmember holes is positioned in the upper crossmember and the lower crossmember;

a plurality of articles of mounting hardware;

the step of mounting the bracket to the frame of the ATV entails insertion of a respective article of mounting hardware through each first hole and an associated crossmember hole;

a plurality of plate holes positioned in a mounting plate of the winch;

a plurality of second holes positioned in the second plate, each second hole being alignable with a respective plate hole; and the step of mounting the winch to the bracket entails insertion of a respective article of mounting hardware through each second hole and an associated plate hole;

the bracket comprising a strut attached to and extending between the first plate and the second plate, the strut being attached to the second plate distal from the first plate, the strut extending angularly to the first plate and being attached to the first plate between the second plate and the lower end of the first plate, wherein the strut is configured for distributing a mass of a load on the winch between the upper crossmember and the lower crossmember of the frame; and wherein the strut, the first plate, and the second plate comprise C-channel, wherein the strut, the first plate, and the second plate are configured for resisting bending.

9. The method of claim 8, further including:

a third plate attached to and extending substantially perpendicularly from the second plate distal from the first plate, the third plate being opposingly positioned relative to the strut;

an opening positioned in the third plate, wherein the opening is configured for insertion of the cable extending from the winch;

a pair of mounting holes positioned in a mounting bracket of the winch;

a pair of third holes positioned in the third plate and bracketing the opening, each third hole being alignable with a respective mounting hole; and the step of mounting the winch to the bracket entails insertion of a respective article of mounting hardware through each third hole and an associated mounting hole.

* * * * *